G. E. DUNTON.
METHOD OF TREATING MOLDS USED IN THE ART OF ELECTROTYPING.
APPLICATION FILED MAY 22, 1911.
1,083,066.
Patented Dec. 30, 1913.
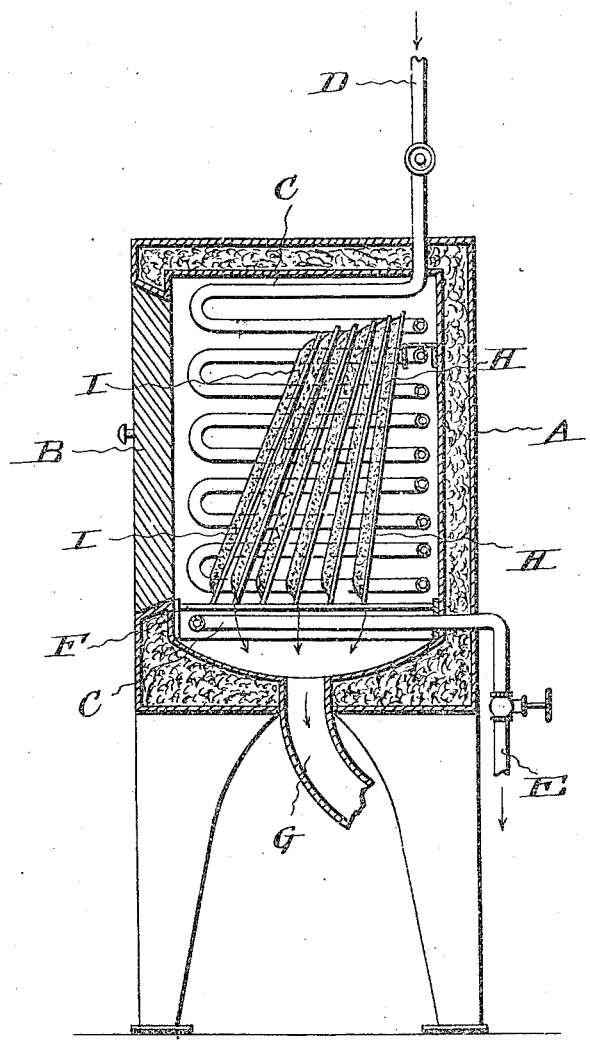
WITNESSES
Walter C. Blackwood
M. E. Jones
INVENTOR
George E. Dunton
by Blackwood Bros.
Attorneys.

UNITED STATES PATENT OFFICE.

GEORGE E. DUNTON, OF NEW YORK, N. Y.

METHOD OF TREATING MOLDS USED IN THE ART OF ELECTROTYPING.

1,083,066.

Specification of Letters Patent.　Patented Dec. 30, 1913.

Application filed May 22, 1911. Serial No. 628,748.

*To all whom it may concern:*

Be it known that I, GEORGE E. DUNTON, residing at New York, in the county of New York and State of New York, a citizen of the United States, have invented certain new and useful Improvements in Methods of Treating Molds Used in the Art of Electrotyping; and I do hereby declare the following to be a full, clear, and exact description of the invention, such as will enable others skilled in the art to which it pertains to make and use the same.

My invention relates to improvements in method of removing the material forming the mold from the pan or case used in the art of electrotyping.

In the art of electrotyping it is necessary to use a back or base for the wax mold, which is commonly known as a molding pan or case, and is preferably made of sheets of very thin metal usually copper, brass or composition metal. These molding pans or cases are heated by being placed on a heated table which is known as a filling table, melted wax is then poured over the surface of the pan or case to a depth of from one quarter of an inch to three quarters of an inch according to the judgment of the operator. After the pouring operation the surface of the wax mold is heated to remove any air bubbles therefrom and the filling table is then cooled until the wax has become sufficiently cooled after which the metal pan or case with the layer of wax adhering thereto, is removed from the filling table. These manipulations are repeated until all the backing pans or cases are filled with wax. The wax mold is next shaved to give it a uniform surface and polished and then coated with a powder composed of graphite and lamp black. The form of type, cut or other object which is to be reproduced or electrotyped is then placed upon the molding press and carefully cleaned to remove any substances which might prove injurious to the electrotype to be reproduced. The wax mold is then placed over the surface of the form of type in the press and pressure is applied, after which the form of type and adhering wax mold are withdrawn from the press, the wax mold is then separated from the form of type and carefully examined and if found without defect is passed on to the builder up. The builder up goes over the mold with a sharp knife cutting off any projecting pieces of wax or irregularities in the surface of the wax mold. The more pronounced blank portions are raised in the mold, which gives greater depth in the plate by being built up, that is an additional layer of wax is added to these blank areas by going over them with a stick of the molding composition, held against a heated iron and melted over the surface of the area of the blank to the desired depth. After the above treatment the mold is cleaned and then treated with a conductive coating of graphite, either by the wet method having the graphite mixed with water and applied to the surface of the wax mold, or by the dry method which consists in first dusting the surface of the wax mold and treating it with dry graphite by any well known means. The mold is then washed out with a spray of water to remove any surplus particles of graphite and air bubbles which might adhere to the recesses formed in the mold by the indentures of the type. A film of copper is then precipitated on the conductive coating of graphite, by the action of iron dust upon a solution of copper sulfate poured over the surface of the graphite coating, and the surplus particles of iron and the excess of sulfate solution, which has become a mixture of copper and iron sulfate, owing to the chemical action which takes place upon adding the metallic iron to the solution of copper sulfate, is rinsed off by a suitable stream of water delivered through a nozzle directed on and over the copper covered surface of the wax mold. The mold is then suspended in the plating bath receiving the desired deposit of metal and after the deposit has attained the required thickness the mold is removed from the bath to a sink and the deposit of metal is removed from the wax mold by pouring boiling hot water over the surface of the deposited metal shell and drawing the shell away from the wax mold as rapidly as the heat from the water melts the wax adhering to the shell.

It is at once evident that not only the metal molding pan but the wax or molding material adhering thereto, after the metal deposit has been removed therefrom, must in the course of continuous manufacturing, be used over and over again. The present method of accomplishing this result is by piling up these pans with the wax thereon upon the steam table and allowing the wax to melt as the heat passes up through the pile from one pan to the next above. This method has many consequent disadvantages and is very slow as the pan resting directly on the steam table must become heated sufficiently to melt the wax thereon, before the second pan and the wax thereon will be heated and so on with each pan and the wax thereon to the top of the pile. The space occupied by these molds while melting could be used to plane down the pans and stack the flattened pans to keep them hot ready for the filling table, thus obviating the necessity of flattening them out after placing them on the filling table and the consequent heating and cooling of the filling table every time the pans are filled. Under the old method of melting off the wax from the pans as described, and which method is universally in practice, the pans after the wax has been melted off must all be scraped one at a time to remove the melted wax, which cannot drain off with the pans lying flat on the steam table but cannot be transferred to the filling table immediately to be planed down or flattened out because the entire top of the steam table is occupied with the pans from which the wax is melting in one pile, and with the pans from which the wax has been scraped in a second pile. By the present method unless the filling table is heated each time the pans are filled, by the time the pans are flattened out, they will have become cooled so that the wax will not stick to them and in the operation of molding the pressure applied to the press to drive the form into the wax of the desired depth will cause the wax to slide away from the pan around the impression and break away from the pan, causing trouble all throughout the process, sometimes resulting in cracks through the impression, when the mold must be thrown away and the work done over again. Thus it is necessary to heat the filling table each time molds are filled, if the pans have to be flattened out or planed down on the filling table before the wax is poured over them, and unless the table is cooled as already described, after the filling, the process becomes prohibitively slow. In the hands of that class of operatives which must, perforce of conditions, be depended upon to do this work, their failure to perform the work intelligently is a source of great annoyance and worry as well as loss of profit.

My method consists in removing the deposited metal from the wax molds and simultaneously subjecting the said molds, and the molding pans or cases containing the molds to an even degree of heat, entirely surrounding the same, by placing said molds and molding pans on edge, preferably in an inclined position, in a closure heated to a degree of heat sufficient to melt the wax molds and cause them to separate or run off from the molding pans.

It will be seen that while by the old method herein described of stacking the pans horizontally on a heated table the heat is radiated upwardly through the pans and molds thereon successively, thus requiring the wax mold in the lower pan to be melted before allowing the heat to pass to the next pan above and so on to the top of the pile, each pan and mold receiving a less degree of heat than the one under it from bottom to top of the pile, and rendering it impossible to heat the pans and mold either evenly or simultaneously and by reason of the pans and molds being stacked horizontally the wax will not entirely run off from the pan and therefore has to be scraped off and this necessitates flattening the pans out afterward, while by my method herein described all the molding pans and molds are heated all over simultaneously and evenly and the wax of the molds quickly melts and runs off leaving the pans entirely clean and free from wax and therefore they do not require scraping and flattening.

The drawing shows a sectional view of one form of apparatus for use in carrying out my method, in which A designates a closure having a door B, a system of heating pipes C within said closure having a steam inlet pipe D and steam outlet pipe E, a grating F and an outlet pipe G at the bottom through which the melted wax from the closure is discharged into any suitable wax melting pot. The melting pans or cases H with the wax molds I thereon are shown as placed on edge within the closure A with their lower edges resting on the grating F. By means of this closure I am able to maintain a temperature of 200° F. which is sufficient to melt the wax molding material from the backing pans.

In removing the wax molds from the pans by my method, the deposited metal is removed from the molds, the molds and pans are then placed on edge on the grating within the heated closure, whereupon the wax on all of the pans thereon will be melted from and run off the pans simultaneously through the grating into the bottom of the closure and thence through the outlet pipe into the wax melting pot where the wax will be reheated for further use. After the wax has all run off, the heat is turned off from the closure and the pans are removed from the closure and are then ready for use again.

What I claim is:—

1. In the art of electrotyping, the method of separating a substantially flat electrotype mold having in its face the impression of the form of type to be reproduced to form a printing plate and a molding pan attached to the back of said mold, which consists in placing the said electrotype mold with the impression in the face thereof and the molding pan attached to the back thereof in a position out of the horizontal and applying heat substantially uniformly thereto, whereby the electrotype mold melts and separates from the molding pan.

2. In the art of electrotyping, the method of separating an electrotype from a substantially flat electrotype mold having in its face the impression of the form of type to be reproduced to form a printing plate and a molding pan attached to the back of said mold, which consists in removing the electrotype, placing said electrotype mold with the impression in the face thereof and the molding pan attached to the back thereof in a position out of the horizontal and applying heat substantially uniformly thereto, whereby the electrotype mold melts and separates from the molding pan.

In testimony whereof, I affix my signature in the presence of two witnesses.

GEORGE E. DUNTON.

Witnesses:
 FRANCIS S. DUFF,
 H. BECKER.